(12) United States Patent
Deng et al.

(10) Patent No.: US 12,299,424 B2
(45) Date of Patent: May 13, 2025

(54) BANDWIDTH-AWARE COMPUTATIONAL GRAPH MAPPING

(71) Applicant: SambaNova Systems, Inc., Palo Alto, CA (US)

(72) Inventors: Gao Deng, Palo Alto, CA (US); Weihang Fan, Mountain View, CA (US); Fei Wang, Palo Alto, CA (US); Yun Du, Palo Alto, CA (US)

(73) Assignee: SambaNova Systems, Inc., Palo Alto, CA (US)

(*) Notice: Subject to any disclaimer, the term of this patent is extended or adjusted under 35 U.S.C. 154(b) by 117 days.

(21) Appl. No.: 18/121,766

(22) Filed: Mar. 15, 2023

(65) Prior Publication Data

US 2023/0297349 A1 Sep. 21, 2023

Related U.S. Application Data

(60) Provisional application No. 63/332,198, filed on Apr. 18, 2022, provisional application No. 63/321,026, filed on Mar. 17, 2022.

(51) Int. Cl.
G06F 8/41 (2018.01)
(52) U.S. Cl.
CPC .................. G06F 8/433 (2013.01)
(58) Field of Classification Search
CPC .................................................. G06F 8/40–78
(Continued)

(56) References Cited

U.S. PATENT DOCUMENTS 8,429,394 B1 * 4/2013 Natoli ............... G06F 8/40
713/100
9,727,460 B2 * 8/2017 Choi ............... G06F 15/7867
(Continued)

FOREIGN PATENT DOCUMENTS

WO 2010142987 A1 12/2010

OTHER PUBLICATIONS

Ansaloni, Giovanni, Paolo Bonzini, and Laura Pozzi. "EGRA: A coarse grained reconfigurable architectural template." IEEE Transactions on Very Large Scale Integration (VLSI) Systems 19.6 (2010): pp. 1062-1074. (Year: 2010).*
(Continued)

*Primary Examiner* — Satish Rampuria
(74) *Attorney, Agent, or Firm* — Flagship Patents; Sikander M. Khan; Bruce A. Young

(57) ABSTRACT

A computer-implemented method of transforming a high-level program for mapping onto a coarse-grained reconfigurable (CGR) processor with an array of CGR units, including sectioning a dataflow graph into a plurality of sections; extracting performance information for each of the plurality of sections; on a CGR unit: assigning to a section at least two computations dependent on a first data element; scheduling an additional load of the first data element in response to available memory bandwidth for that section; eliminating a buffer between the additional load of the first data element and one of the two computations, for that section; generating configuration data for the placed positions and the routed data and communication channels, wherein the configuration data, when loaded onto an instance of the array of CGR units, causes the array of CGR units to implement the dataflow graph; and storing the configuration data in a non-transitory computer-readable storage medium.

9 Claims, 9 Drawing Sheets

(58) Field of Classification Search
USPC .................................................. 717/120–178
See application file for complete search history.

(56) References Cited

U.S. PATENT DOCUMENTS

| | | | | |
|---|---|---|---|---|
| 2007/0220522 A1* | 9/2007 | Coene | ................... | G06F 30/392 |
| | | | | 718/104 |
| 2020/0004538 A1* | 1/2020 | Fleming, Jr. | .......... | G06F 15/825 |
| 2021/0200540 A1* | 7/2021 | Chofleming | ............ | G06F 15/80 |
| 2022/0100680 A1* | 3/2022 | Chrysos | .............. | G06F 13/4027 |
| 2023/0315415 A1* | 10/2023 | Windh | .................... | G06F 8/453 |
| 2024/0362024 A1* | 10/2024 | Porterfield | ............ | G06F 9/3836 |

OTHER PUBLICATIONS

Venkataramani, Girish, et al. "Automatic compilation to a coarse-grained reconfigurable system-opn-chip." ACM Transactions on Embedded Computing Systems (TECS) 2.4 (2003): pp. 560-589. (Year: 2003).*

Podobas, Artur, Kentaro Sano, and Satoshi Matsuoka. "A survey on coarse-grained reconfigurable architectures from a performance perspective." IEEE Access 8 (2020): pp. 146719-146743. (Year: 2020).*

Brisk, Philip, Adam Kaplan, and Majid Sarrafzadeh. "Area-efficient instruction set synthesis for reconfigurable system-on-chip designs." Proceedings of the 41st annual Design Automation Conference. 2004. pp.395-400 (Year: 2004).*

Cardoso, Joao MP, Pedro C. Diniz, and Markus Weinhardt. "Compiling for reconfigurable computing: A survey." ACM Computing Surveys (CSUR) 42.4 (2010): 1-65. (Year: 2010).*

Hartenstein, Reiner. "A decade of reconfigurable computing: a visionary retrospective." Proceedings design, automation and test in Europe. Conference and exhibition 2001. IEEE, 2001.pp.642-649 (Year: 2001).*

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner (For FIG. 2, see next page)

BANDWIDTH-AWARE COMPUTATIONAL GRAPH MAPPING

CROSS-REFERENCES AND INCORPORATIONS

This application claims the benefit of U.S. provisional patent application No. 63/321,026, entitled, "Bandwidth Aware Graph Mapping," filed on 17 Mar. 2022. This application further claims the benefit of U.S. provisional patent application No. 63/332,198, entitled, "DDR Bandwidth Aware Graph Mapping and Repeat Pattern Graph Mapping," filed on 18 Apr. 2022. The two provisional applications are hereby incorporated by reference for all purposes.

The following are incorporated by reference for all purposes:

Prabhakar et al., "Plasticine: A Reconfigurable Architecture for Parallel Patterns," *ISCA* '17, Jun. 24-28, 2017, Toronto, ON, Canada; and Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.

BACKGROUND

Technical Field

The technology disclosed relates to extracting, optimizing and executing computational graphs for deep learning and artificial intelligence models. In particular, it relates to computational graph mapping and scheduling onto an arrangement of course-grained reconfigurable (CGR) architecture (CGRA) units based in part on available memory bandwidth.

Context

Reconfigurable processors, including field programmable gate arrays (FPGAs), can be configured to implement a variety of functions with better performance and energy efficiency than a general-purpose processor executing a computer program. Reconfigurable processors may include fine-grained programmable fabric such as configurable logic blocks, programmable routing resources, and programmable I/O (Input/Output). So-called coarse-grained reconfigurable (CGR) architectures (CGRA) embed more complex elements such as processors, multipliers, and memories. The use of course-grained blocks can reduce area and delay because course-grained blocks can be used to implement specific functions more efficiently than fine-grained logic. However, the area of a course-grained block is wasted if it is not used in a particular application. CGRAs may enable faster or more energy-efficient execution of various classes of functions.

SUMMARY

A computer-implemented method of transforming a high-level program for mapping onto a coarse-grained reconfigurable (CGR) processor with an array of CGR units, including sectioning a dataflow graph into a plurality of sections; extracting performance information for each of the plurality of sections; on a CGR unit: assigning to a section at least two computations dependent on a first data element; scheduling an additional load of the first data element in response to available memory bandwidth for that section; eliminating a buffer between the additional load of the first data element and one of the two computations, for that section; generating configuration data for the [[placed positions and the routed data]] and communication channels, wherein the configuration data, when loaded onto an instance of the array of CGR units, causes the array of CGR units to implement the dataflow graph; and storing the configuration data in a non-transitory computer-readable storage medium.

Particular aspects of the technology disclosed are described in the claims, specification and drawings.

BRIEF DESCRIPTION OF THE DRAWINGS

The technology will be described with reference to the drawings, in which.

Figure 1:
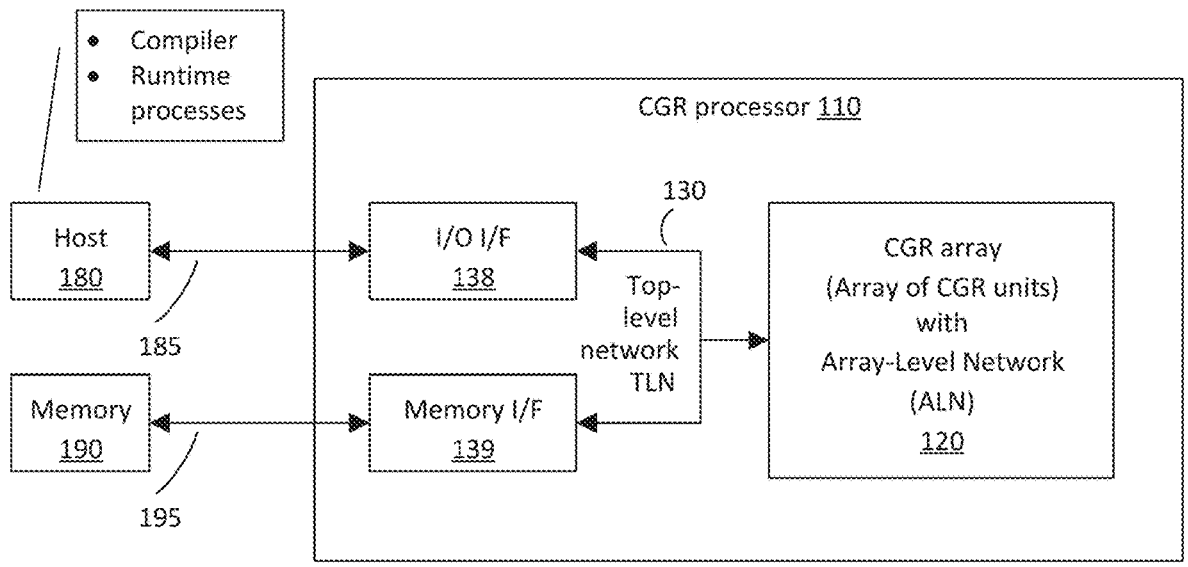
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

The following detailed description refers to the accompanying drawings. Like reference numbers (when used) indicate the same or similar elements. A reference number may be used for one or more exemplary elements in a drawing within an arrangement of additional same or similar elements not explicitly linked to the reference number to avoid obscuring the drawings with numerous reference numbers and reference lines. Unless otherwise specified, the use of ordinal adjectives first, second, third, etc., to describe an object or process step merely refers to different instances or classes of the object or process step and does not imply a ranking or sequence. Well-known information, hardware, software, systems, machines, methods, or components thereof, that may be useful or necessary in a commercially feasible embodiment may not be illustrated or described, or may not be described in detail, to facilitate a less hindered view of the technology. Each feature or combination of features disclosed in the specification may be replaced by similar or equivalent features or combinations of features unless expressly stated otherwise. The following detailed description is to be taken in an illustrative sense rather than a limiting or restrictive sense. Features may be added, omitted, or modified to adapt the technology disclosed to particular applications and advances in relevant technologies.

Traditional computation uses a central processing unit (CPU). For many years, the performance improvement of CPU architectures were largely driven by exploiting instruction-level parallelism. For the last two decades, CPU performance improvement has largely been driven by incorporating additional cores (so-called multi-core CPUs) each having multiple threads. Various multi-core CPUs introduced in recent years have about 2 to 128 cores. More recently, performance improvement trends for multi-core CPUs have tapered off.

Demand is growing for systems that can run complex algorithms in various domains, including machine learning (ML), artificial intelligence (AI), computational physics, and genomics. Many of these algorithms benefit from architectures that are designed for massively parallel computations, such as graphics processing units (GPUs) and coarse-grained reconfigurable (CGR) architectures (CGRAs).

A Graphics Processing Unit (GPU) generally has thousands of cores. GPUs may do well with certain massively parallel computations, but not with others. Because of limitations in the organization of a particular GPU, the GPU may not be able to efficiently process a particular ML or AI model, for example. The GPU may not be able to feed the right cores with the right data as fast as needed to efficiently perform computations for some applications.

For traditional CPU and GPU architectures, a key challenge is using data and model parallel techniques to break the workload up and spread it across resources to optimize results. Particularly for model parallel techniques, this requires developing external frameworks or using trial-and-error guesswork to split the model apart. Moving a model from a single processor to a large compute cluster often requires considerable extra development effort, orchestration and specialized expertise. Scaling out to a large cluster with GPUs to obtain enough associated memory can also result in a large sacrifice in utilization because more processor resources than necessary are incorporated.

Computing applications and their associated operations require both computation and communication. In traditional core-based architectures, the computation is programmed as required. However, the communications are managed by the hardware and are limited primarily to cache and memory transfers. The inability to manage how data flows from one intermediary calculation to the next can result in excessive data transfers and poor hardware utilization.

According to a study by OpenAI, compute usage for training AI systems roughly tracked Moore's law (doubling every 2 years) from 1959 to about 2012 but in a more recent period has doubled every 3.4 months. Natural language processing (NLP) models, for example, are trending to computationally intensive, large-capacity transformer models. Generative Pre-Trained Transformer (GPT) 3 (GPT-3) is an NLP model that can be trained to generate realistic human text. Its deep learning neural network (NN) is a model with over 175 billion ML parameters. The largest trained language model before GPT-3 was Microsoft's Turing NLG model, which had 10 billion parameters. NLP models are being applied to many applications including document analysis, search engines, advertising content suggestions, trading signals, automated service agents, sentiment analysis, fraud detection, personal assistants, and chatbots.

Reconfigurable processors, including field programmable gate arrays (FPGAs), can be configured to implement a variety of functions with better performance and energy efficiency than a CPU or a GPU. Reconfigurable processors may include fine-grained programmable fabric such as configurable logic blocks, programmable routing resources, and programmable I/O (Input/Output). So-called coarse-grained reconfigurable (CGR) architectures (CGRA) embed more complex elements such as processors, multipliers and memories. Use of course-grained blocks can reduce area and delay because they can be used to implement specific functions more efficiently than fine-grained logic. CGRAs enable faster or more energy-efficient execution of various classes of functions.

An exemplary implementation of a CGRA (e.g., Samballova Systems, Inc. SN10-8) includes eight reconfigurable dataflow units (RDUs) each of which employ four tiles each with 160 pattern compute units (PCUs) and 160 pattern memory units (PMUs). Each RDU has six channel memory with 256 gigabytes (GB) of Double Data Rate 4 (DDR4) memory per channel. A system with 8 RDUs has 5,120 PCUs and 5,120 PMUs with 48 channels interfacing with 12 terabytes (TB) of DDR4 memory. The system can scale, with four SN10-8's fitting on each rack. Host and RDU-to-RDU communications are handled by 32 Peripheral Component Internet Express (PCIe) 4.0×16 links.

A one-time configuration program is run to map an entire ML model, for example, onto RDUs. In one embodiment, a software stack takes input from standard ML frameworks such as PyTorch or TensorFlow. The software stack automatically extracts dataflow graphs from a framework and maps the dataflow graphs onto RDUs. The software stack automatically decomposes the dataflow graphs according to the resources required to execute the graph. It automates the scaling of workloads across multiple RDUs. An optimization process may be performed to search for improvement in the mapping to the CGRA resources. This automated process results in an optimized, custom accelerator while avoiding low-level programming and time-consuming trial-and-error tuning.

"Optimize" as used herein means to improve, not necessarily to perfect. For example, it may be possible to make further improvements in the mapping of dataflow graphs onto RDUs even though the mapping has already been optimized. Automated optimization may depend on an objective function to be maximized or minimized. For example, an objective function may depend on measured (or simulated) performance, for example, for one or more ML models executed (simulated) on a CGRA processor. The optimization process searches through a space of mapping parameters to optimize the configuration according to the objective function. The scope of an optimization search may be limited by constraints such as the number of available PCUs and PMUs and their organization in a particular CGRA processor. Different results may be found using different objective functions or different constraints. An optimization search may converge on local maxima or minima even though better maxima or minima exist. Further, an optimization search may complete by returning the best search result found according to the objective function after reaching a limiting condition such as maximum search time, maximum search iterations, or when a combination of search parameters is found with satisfactory results according to predetermined criteria.

CGRAs allow communications to be programmed and optimized. CGRA avoids the latency of context switching and excess memory accesses faced when models are executed on traditional core-based architectures of CPUs and GPUs. By factoring in both the sequence of instructions and the physical arrangement of the network of resources in the RDUs, the compute graph can be allocated to the RDUs and routed through the physical resources within the RDUs to create a pipelined accelerator optimized for the desired workload. This may result in higher throughput, higher hardware utilization, and lower latency. This process is sometimes referred to as spatial programming or "place and route."

Spatial programming involves configuring the physical resources of the network of RDUs so that data progresses efficiently in parallel across the fabric of the system. Fast reconfiguration allows the data to progress efficiently for a sequence of instructions (layers) running on a system at a specific time. Some examples of commonly occurring operations or parallel patterns include element-wise functions (map), element-wise multi-collection functions (zip), and combine all elements functions. Even in these few examples, dataflow patterns vary widely demonstrating the flexibility that programmable dataflow can provide.

An RDU is an example of a CGR processor. A CGR processor, which includes one or more CGR arrays (arrays of CGR units), can be programmed to simultaneously execute one or more dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Although some technology herein is described with respect to CGRA systems, it may also be applicable to other architectures. The technology may be applicable to systems that incorporate CPUs, GPUs, application-specific integrated circuits (ASICs) or field-programmable gate arrays (FPGAs), or some combination thereof.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 includes compute units and memory units that are connected with an array-level network (ALN). In some embodiments, the memory units are interspersed among compute units. to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing.

In some implementations, execution of the graph(s) may use multiple instances of a CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes, as further referenced herein, and may also be used to run computer programs, such as the compiler further described herein with reference to FIG. 12. In some implementations, the compiler may run on a computer that is similar to the computer described with reference to FIG. 2, but separate from host 180.

CGR processor 110 may accomplish computational tasks by executing a configuration file (for example, a processor-executable format (PEF) file). For the purposes of this description, a configuration file corresponds to a dataflow graph, or a translation of a dataflow graph, and may further include initialization data. A compiler compiles the high-level program to provide the configuration file. In some implementations described herein, a CGR array is configured by programming one or more configuration stores with all or parts of the configuration file. A single configuration store may be at the level of the CGR processor or the CGR array, or a CGR unit may include an individual configuration store. The configuration file may include configuration data for the CGR array and CGR units in the CGR array, and link the computation graph to the CGR array. Execution of the configuration file by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
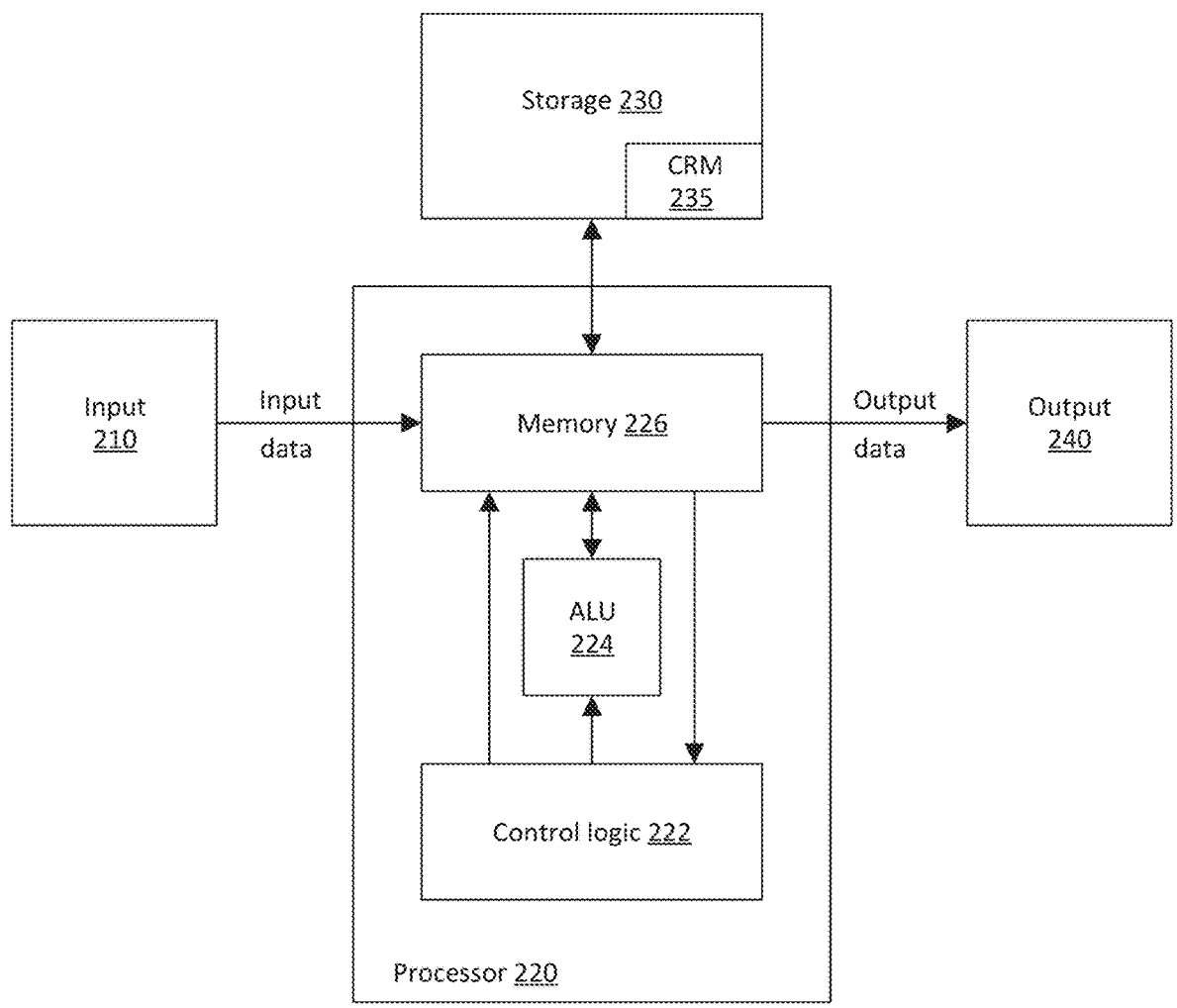
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. In some embodiments, memory 226 includes static random-access memory (SRAM) and storage device 230 includes dynamic random-access memory (DRAM), flash memory, magnetic disks, optical disks, or any other memory type known in the art. At least a part of the memory in storage device 230 includes a non-transitory computer-readable medium (CRM 235), such as used for storing computer programs.

Figure 3:
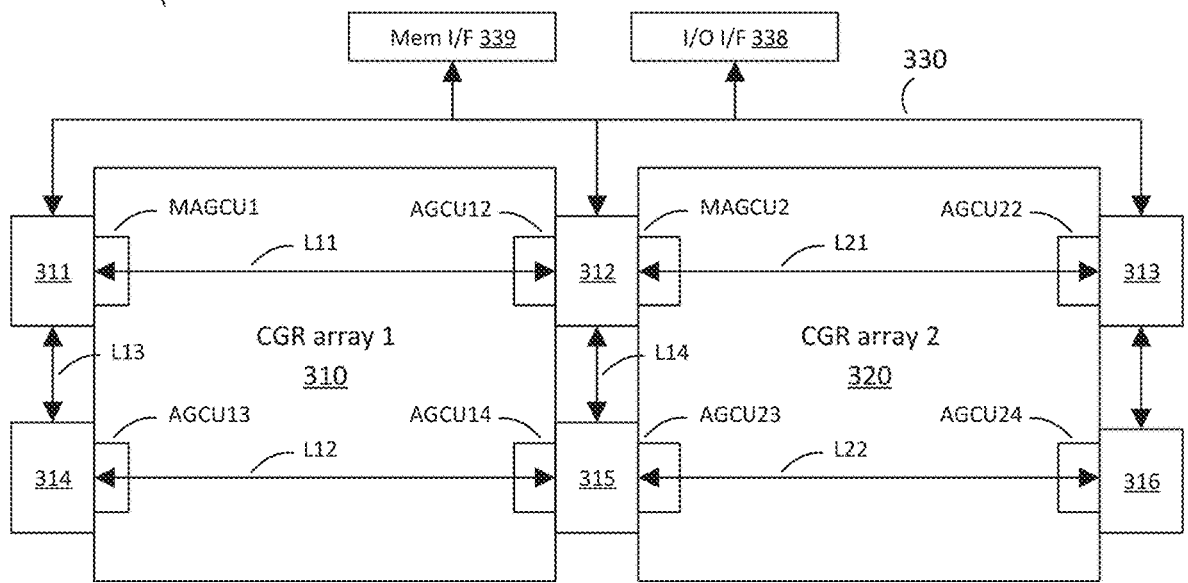
FIG. 3 illustrates example details of a CGR architecture including a top-level network (TLN) and two CGR arrays.

FIG. 3 illustrates examplary details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
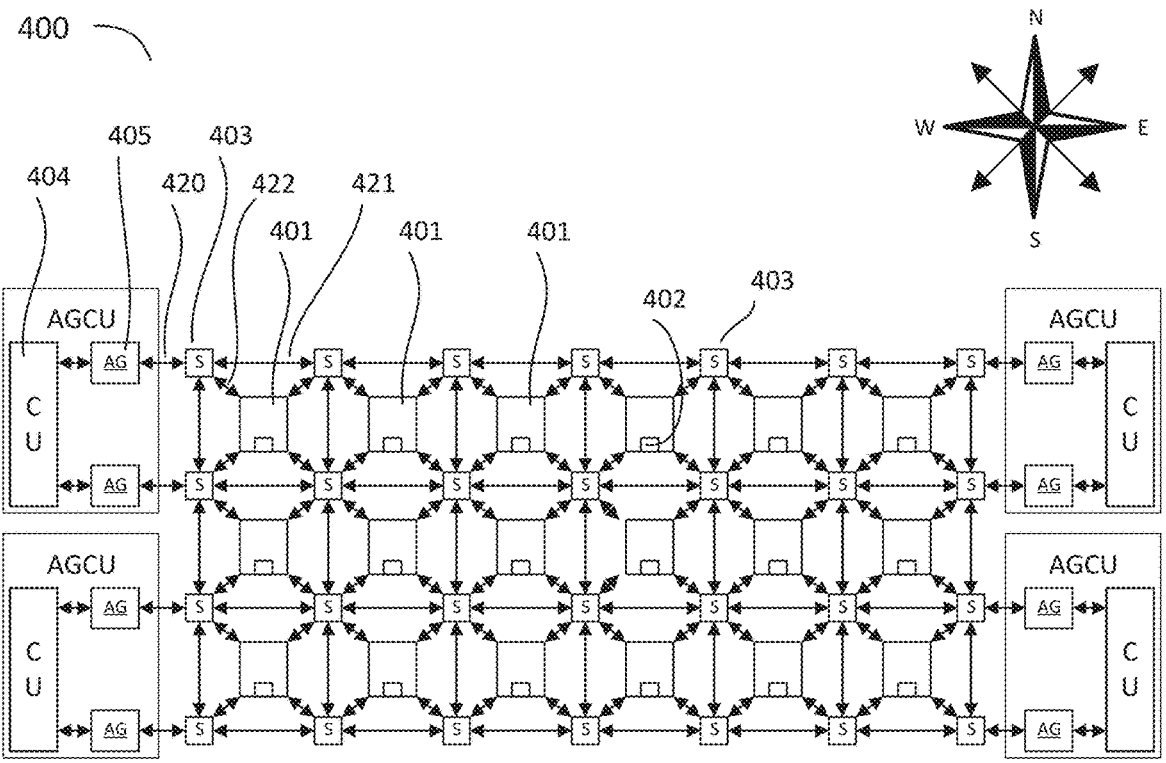
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels are established as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the configuration file for the CGR array. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
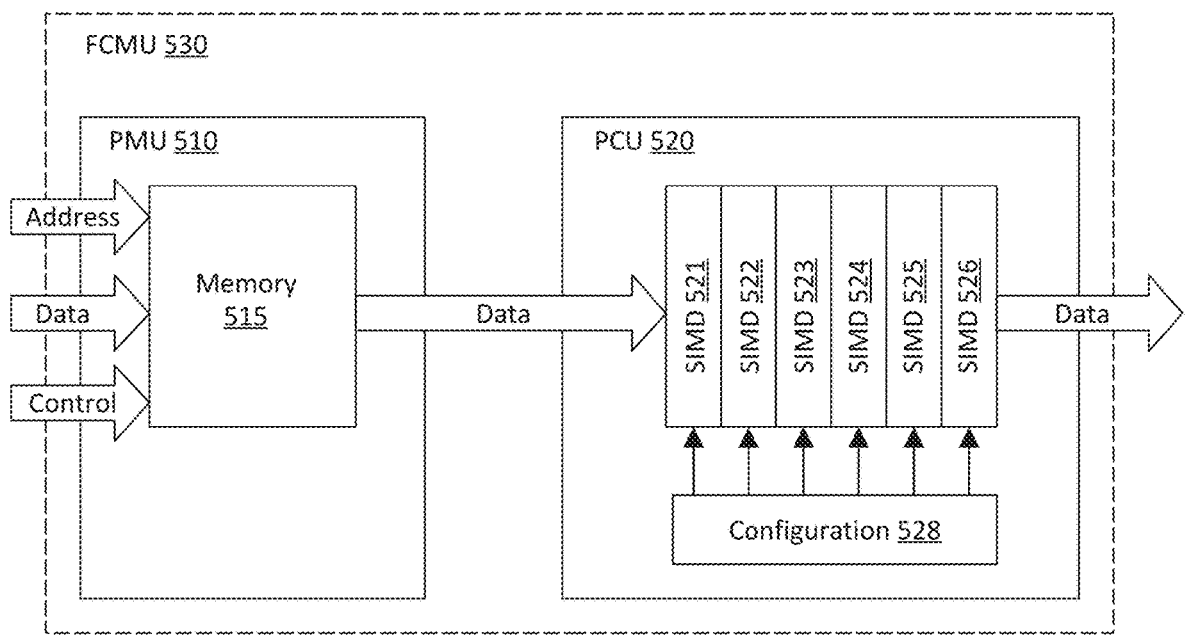
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
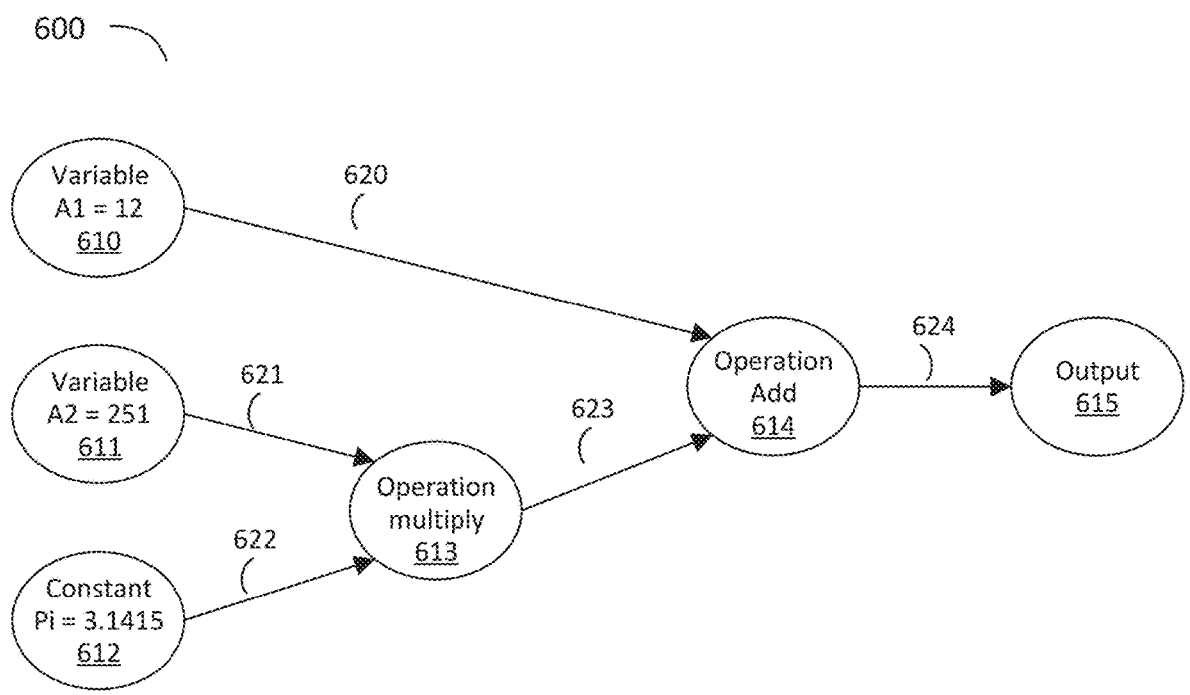
FIG. 6 shows an example of a computation graph.

FIG. 6 shows an example of a computation graph 600. Computation graphs represent mathematical expressions, and comprise nodes and directed edges. In FIG. 6, nodes are drawn as circles and directed edges are drawn as arrows. A node can represent a constant, a variable, for example from an input, an operation, an equation, or an output value. A directed edge can represent a dependency. Node 610 represents a variable A1, whose present value equals 12. Node 611 represents a variable A2, whose present value equals 251. Node 612 represents the constant n. Node 613 represents a multiplication operation. It receives its input data from node 611 via directed edge 621 and from node 612 via directed edge 622. Node 614 represents an addition operation. Node 614 receives its input data from node 610 via directed edge 620 and from node 613 via directed edge 623. Node 614 outputs its result in output node 615 via directed edge 624. Computation graph 600 as a whole represents the equation Output=A1+pi*A2.

The depicted computation graph 600 is very simple and could be implemented electronically in many ways. For example, it could be hardwired as a circuit of digital gates in an application-specific IC (ASIC), or an FPGA could be configured to emulate the circuit of digital gates, or a CGR processor could be configured to perform the addition and multiplication functions, or a CPU could run a conventional computer program to perform the functions. In all implementations, the timing is important. Node 614 is not able to calculate a valid output value until all its input values are valid. That means node 613 must be finished first. Most digital circuits are implemented as pipelines of clocked stages. If the add operation of node 614 is in a later stage than the multiplication operation of node 613, then a fixed-delay buffer may need to be inserted between node 610 and node 614 to synchronize the value of variable A1 with the result of the multiplication in node 613. The fixed-delay buffer can be added to the graph to make it physically implementable.

Most computation graphs are a-cyclic, i.e., they don't include loops. One class of computation graphs, dataflow graphs, may include loops, and even nested loops. This can make delays of operations performed by nodes variable, dependent on the data flowing through a pipeline of operations. When a high-level program includes multiple pipelines of parallel, interdependent operations, then synchronization can become highly complex. Synchronization can be further complicated when directed edges are implemented as data channels in a network, since the data channels can become congested. A CGR processor, may resolve both problems by using dataflow control information, sent as messages from consuming nodes to producing nodes to indicate that the consuming node is ready to receive the information, and a credit token system that prevents congestion of the data channels between the producing and consuming nodes.

Figure 7:
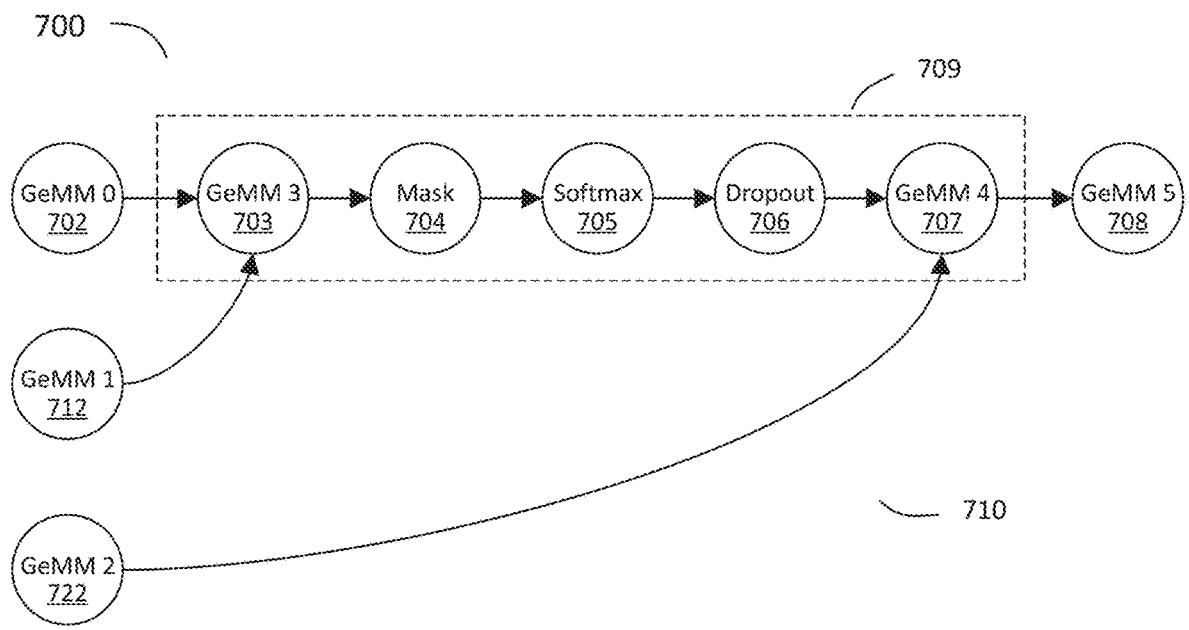
FIG. 7 shows an example of a dataflow graph.

FIG. 7 shows an example of a dataflow graph 700. This example, one head of a multi-head attention module in the Transformer model first published by Vaswani, et al., "Attention Is All You Need," 31st Conference on Neural Information Processing Systems, 2017, is well known in the industry. It includes a loop 709 within a loop 710. Loop 710 includes four general matrix multiplications, GeMM 702, GeMM 712, GeMM 722, and GeMM 708. Loop 709 includes an ingress matrix multiplication GeMM 703, mask fill node 704, softmax node 705, dropout node 706, and egress matrix multiplication node 707.

To physically implement dataflow graph 700, an implementation may insert three types of stage buffers: (1) inter-stage buffers, (2) intra-stage buffers, and (3) interface buffers. The interface buffers are used because the granularity of communication (i.e., the size of tensors or data produced or consumed) varies between loops at different levels. Further, an implementation must add dataflow control information, to synchronize the various stages of asynchronous computation.

Figure 8:
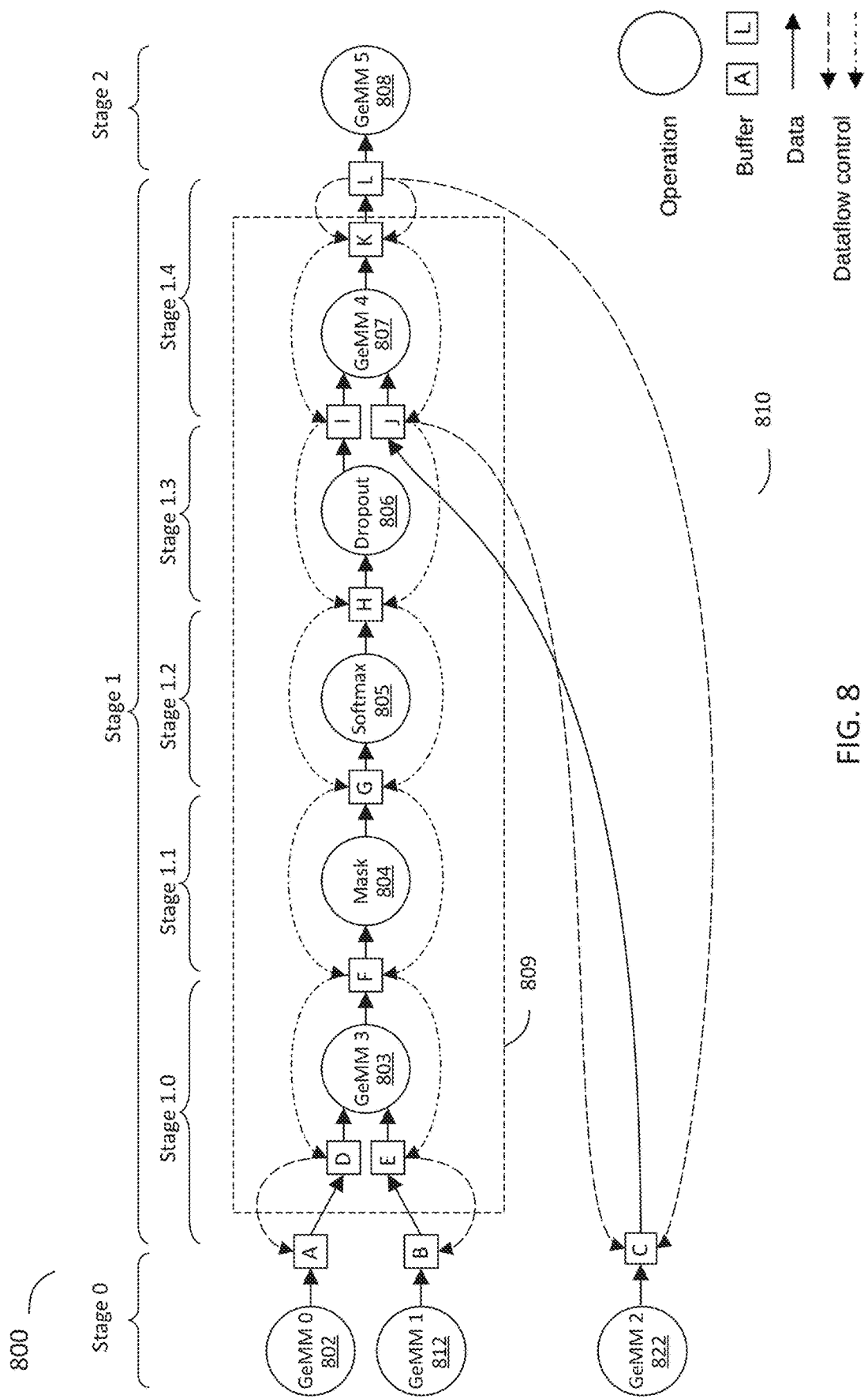
FIG. 8 shows the dataflow graph of FIG. 7 with buffers and dataflow control information added.

FIG. 8 shows the dataflow graph of FIG. 7 with buffers and dataflow control information added. A compiler in the technology presented herein can create graph 800 from dataflow graph 700, assign the nodes to compute units and memory units in a CGR array, and assign edges and dataflow control information to data channels in an array-level network that connects the compute units and memory units.

To get from dataflow graph 700 to graph 800, one compiler implementation divides the dataflow graph in stages (stages 0, 1, and 2 are shown in this example), and where there are nested loops also in substages (substages 1.0 through 1.4 are shown). The implementation inserts buffers between the stages to allow for pipelined processing in one or more parallel meta-pipelines that may interact. The buffers are shown as blocks labeled A . . . L. They are different from buffers at the gate level, which may be single or double inverters used to boost the energy level of digital signals that need to travel through long wires or that need to drive high-capacitance loads, or which may be flipflops operated by a system clock and used to implement synchronous logic. The buffers at the meta-pipeline level may be memories, register files, shift registers, or first-in-first-out (FIFO) memories of fixed or variable length, storing one or more data items (e.g., scalars, vectors, or tensors). They may be clocked by a producer node to store data or by a consumer node to release data. They may further be controlled by dataflow control information coming from, for example, downstream nodes. FIG. 8 shows the same operation nodes as FIG. 7 (with like numbering), but the edges (solid arrows), where data flows, are interrupted by the buffers to partition the graph into stages, and dataflow control information is added (shown as dashed arrows for loop 810 and dash-dot arrows for loop 809). In the example shown, data travels downstream (solid arrows from the left to the right) and dataflow control information travels upstream (dashed arrows from the right to the left).

In further preparation for a physical implementation of graph 800, an implementation may assign each operation node to one or more logical compute units or memory units, and each buffer to one or more logical memory units. Some implementations may perform further preparations and optimizations. All implementations proceed to place and route, i.e., assign the logical units to physical units in a layout of a CGR array, and (in some implementations) assign the data connections and the dataflow control information connections to data channels in the ALN in the CGR array.

Figure 9:
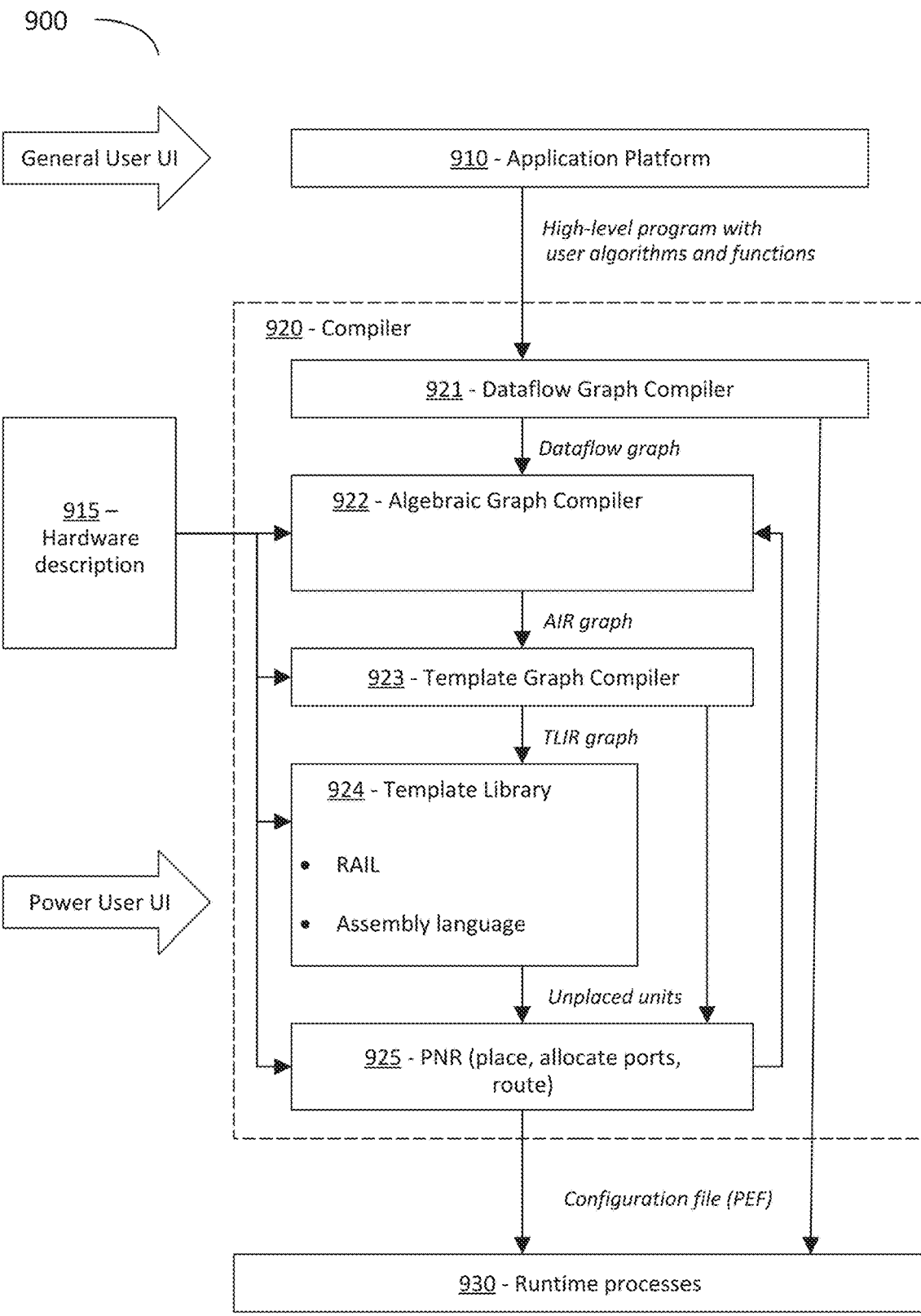
FIG. 9 is a block diagram of a compiler stack implementation suitable for generating a configuration file for a CGR processor.

FIG. 9 is a block diagram of a compiler stack 900 implementation suitable for generating a configuration file for a CGR processor. As depicted, compiler stack 900 includes several stages to convert a high-level program with user algorithms and functions, e.g., algebraic expressions and functions, to configuration data for the CGR units. Compiler stack 900 may take its input from application platform 910, or any other source of high-level program statements suitable for parallel processing, which provides a user interface for general users. It may further receive hardware description 915, for example defining the physical units in a reconfigurable data processor or CGRA processor. Application platform 910 may include libraries such as PyTorch, TensorFlow, ONNX, Caffe, and Keras to provide user-selected and configured algorithms. Application platform 910 outputs a high-level program to compiler 920, which in turn outputs a configuration file to the reconfigurable data processor or CGRA processor where it is executed in runtime processes 930. Compiler 920 may include dataflow graph compiler 921, which may handle a dataflow graph, algebraic graph compiler 922, template graph compiler 923, template library 924, and placer and router PNR 925. In some implementations, template library 924 includes RDU abstract intermediate language (RAIL) and/or assembly language interfaces for power users.

Dataflow graph compiler 921 converts the high-level program with user algorithms and functions from application platform 910 to one or more dataflow graphs. The high-level program may be suitable for parallel processing, and therefore parts of the nodes of the dataflow graphs may be intrinsically parallel unless an edge in the graph indicates a dependency. Dataflow graph compiler 921 may provide code optimization steps like false data dependency elimination, dead-code elimination, and constant folding. The dataflow graphs encode the data and control dependencies of the high-level program. Dataflow graph compiler 921 may support programming a reconfigurable data processor at higher or lower-level programming languages, for example from an application platform 910 to C++ and assembly language. In some implementations, dataflow graph compiler 921 allows programmers to provide code that runs directly on the reconfigurable data processor. In other implementations, dataflow graph compiler 921 provides one or more libraries that include predefined functions like linear algebra operations, element-wise tensor operations, non-linearities, and reductions required for creating, executing, and profiling the dataflow graphs on the reconfigurable processors. Dataflow graph compiler 921 may provide an application programming interface (API) to enhance functionality available via the application platform 910.

Algebraic graph compiler 922 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 922 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 922 may further include an arithmetic or algebraic intermediate representation (AIR) level that translates high-level graph and mapping decisions provided by the MAC level into explicit AIR graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 923 may translate AIR graphs into TLIR graphs, optimizing for the target hardware architecture and/or into unplaced units suitable for PNR 925. Template graph compiler 923 may add further information (name, inputs, input names and dataflow description) for PNR 925 and make the graph physically realizable through each performed step. Template graph compiler 923 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 924 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

PNR 925 translates and maps logical (i.e., unplaced physically realizable) CGR units to the physical chip level (e.g., a physical array of CGR units), determines physical data channels to allow for communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 925 may provide its functionality in multiple steps and may include multiple modules (not shown in FIG. 9) to provide the multiple steps, e.g., a placer, a router, a port allocator, and a PEF file generator. PNR 925 may receive its input data in various ways. For example, it may receive parts of its input data from any of the earlier modules (dataflow graph compiler 921, algebraic graph compiler 922, template graph compiler 923, and/or template library 924). In some implementations, an earlier module, such as template graph compiler 923, may have the task of preparing all information for PNR 925 and no other units provide PNR input data directly.

Further implementations of compiler 920 provide for an iterative process, for example by feeding information from PNR 925 back to an earlier module, so that the earlier module can execute a new compilation step in which it uses physically realized results rather than estimates of or placeholders for physically realizable circuits. For example, PNR 925 may feed information regarding the physically realized circuits back to algebraic graph compiler 922.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 920 binds memory allocations to unplaced memory units and binds operations specified by operation nodes in the dataflow graph to unplaced compute units, and these bindings may be specified in the configuration data. In some implementations, compiler 920 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 920 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 10:
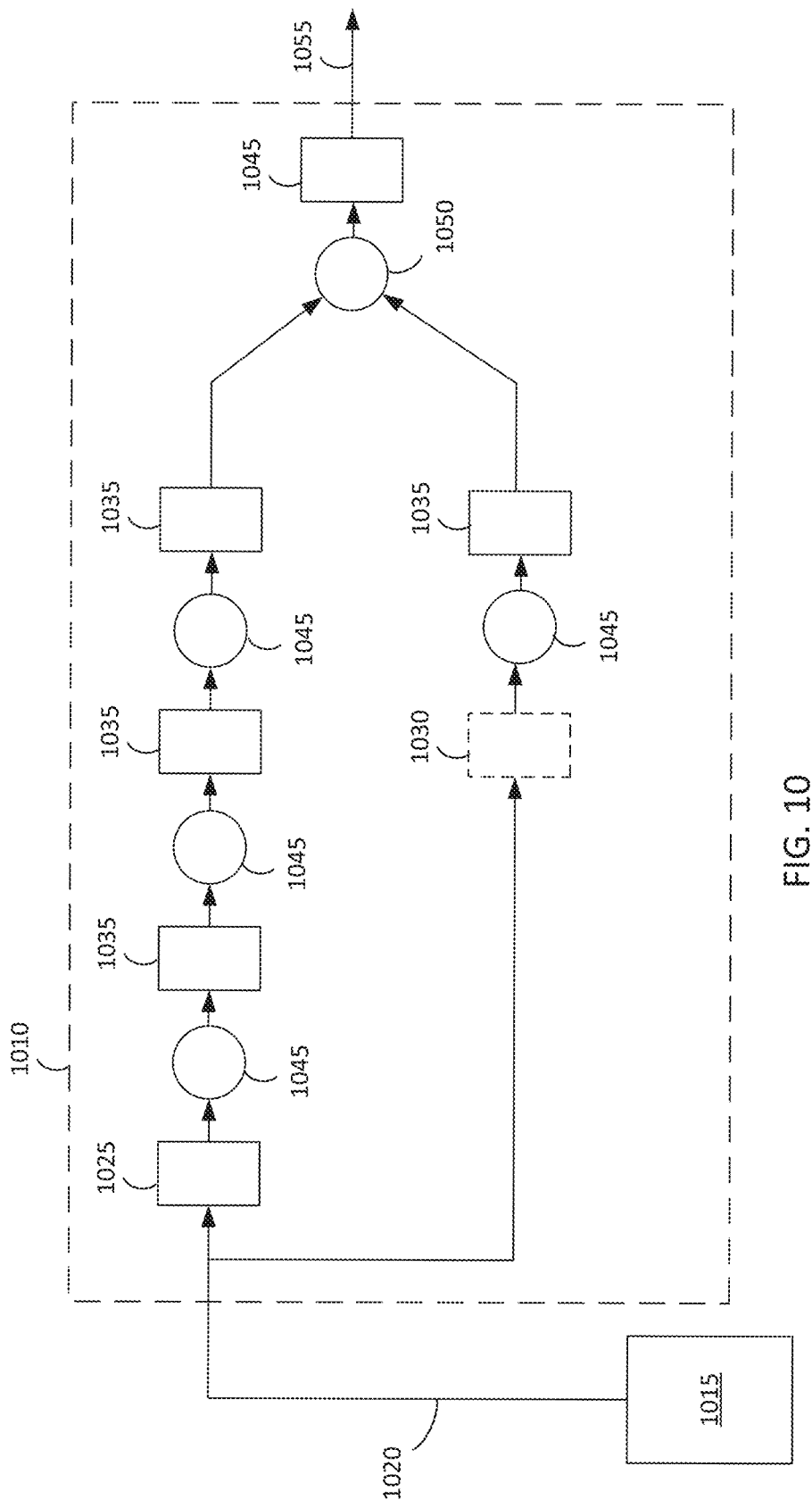
FIG. 10 is a block diagram of a section of a computational diagram performing a single data load to two buffers.

FIG. 10 illustrates one embodiment of a computation graph including two sequences of operations 1045 interspersed with buffers 1035. Each of these operations may be multiplies or adds, for example. The outside boundary defines a section 1010 of the computational graph that is allocated to a particular CGR unit for a particular time segment. The CGR unit interfaces with DRAM 1015.

A DRAM load 1020 of a particular data region is routed to an input of two branches of the computation sequence within the section. The DRAM load 1020 is input into a buffer 1025 that is part of a first branch of the computation sequence and input into a buffer 1030 that is part of a second branch of the computation sequence. These buffers can be large multi-stage buffers which are expensive in terms of silicon area. Buffer 1025 is generally balanced with buffer 1030 in terms of size and the number of stages.

Figure 11:
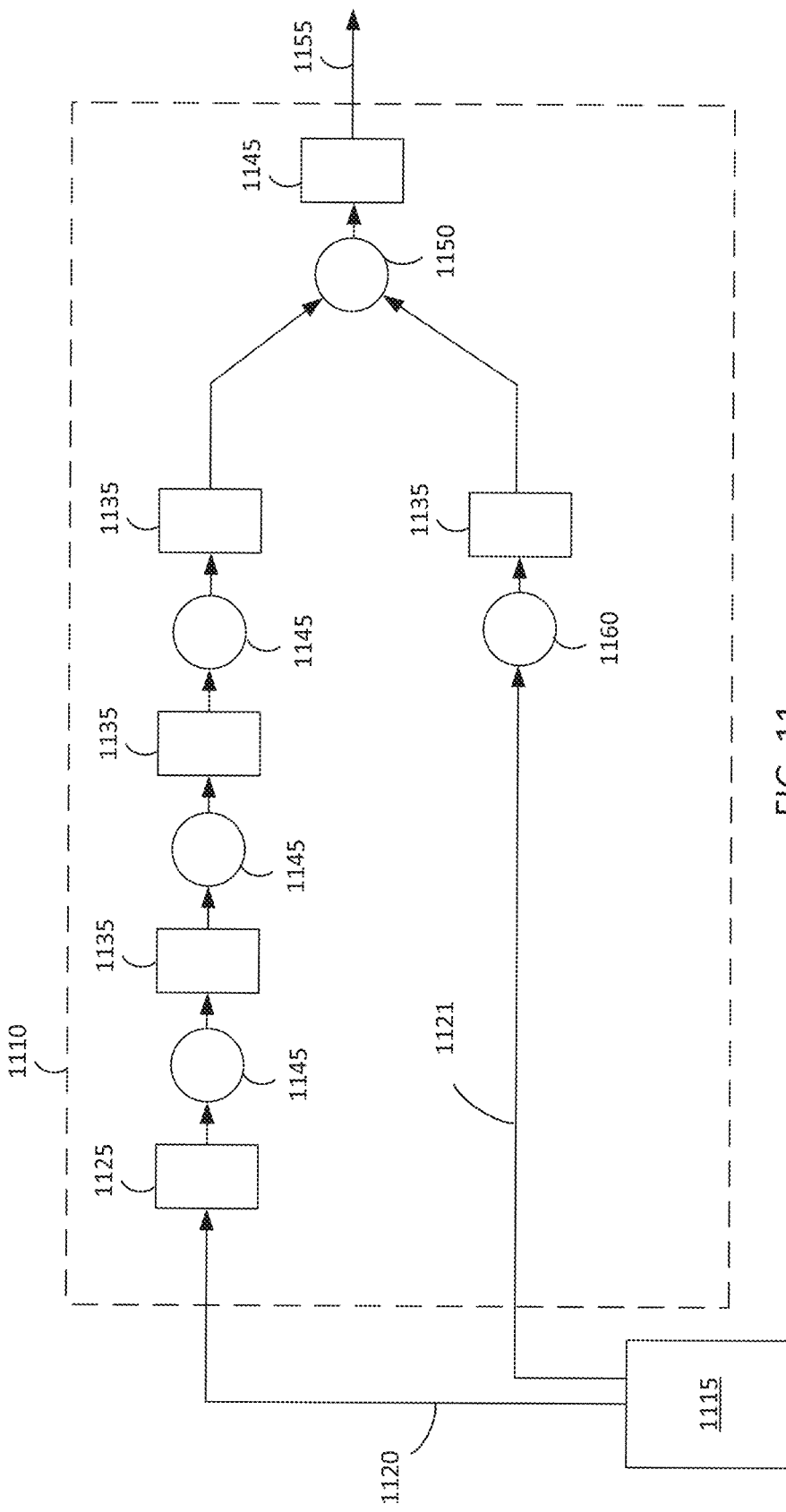
FIG. 11 is a block diagram of a section of a computational diagram performing splitting the single data load of FIG. 10 into two data loads, and eliminating a buffer.

When there is additional bandwidth available for the section 1010, the DRAM load 1020 illustrated in FIG. 10 may be split into two DRAM loads of the same data element of DRAM 1115 spaced apart in time within the segment, as shown in FIG. 11. These two DRAM loads are DRAM load 1120 and DRAM load 1121.

A first DRAM load 1120 is routed to the buffer 1125 of the first branch of the computation sequence. A second DRAM load 1125 is routed directly to the operation 1155 in the second branch of the computation sequence. This second DRAM load 1125 uses more bandwidth for that section 1110 than when a single DRAM load feeds both branches in section 1010. Since the second DRAM load 1121 can timely load the data a second time later than the first load of that data, a buffer corresponding to buffer 1030 in FIG. 10 can be eliminated. The eliminated buffer is not necessary to maintain the loaded data for the intervening time. Thus, bandwidth for the second DRAM load 1121 of the same data loaded in the first DRAM load 1120 (FIG. 11) is traded for the silicon area of the second buffer 1030 (FIG. 10).

If there is sufficient bandwidth available for the section 1110, additional data loads of the same data can be performed for additional sequences to eliminate a corresponding buffer. For example, a third data load may be used to eliminate a corresponding buffer at the input of a third branch of the computation sequence within the section. In other embodiments, the computation sequences receiving second or third data loads may be independent of each other and independent of the first data load within that section.

In FIG. 10, an operation 1050, such as a sum, is performed on the output of the two branches. The output of the sum operation is input into the buffer 1045 which drives an output 1055 of the section 1010. In FIG. 11, an operation 1150, such as a sum, is performed on the output of the two branches. The output of the sum operation is input into buffer 1145 which drives an output 1155 of the section 1110.

Figure 12:
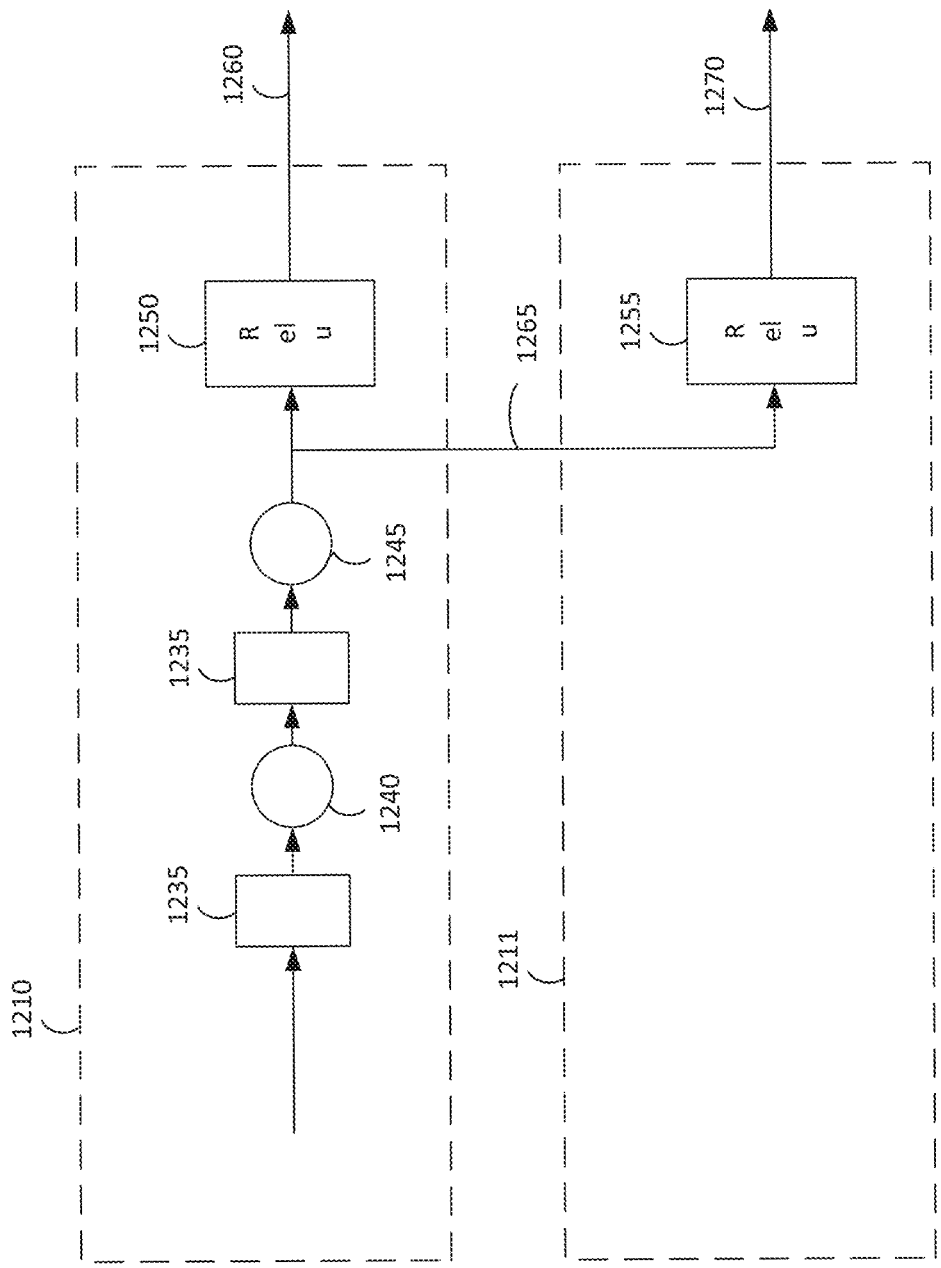
FIG. 12 is a block diagram of two sections showing a section boundary that combines a checkpoint with an intermediate result.

FIG. 12 shows two sections of a computational graph each allocated to one or more CGR processors for a time segment. The outside boundary represents a section of the computational graph that is allocated to a particular CGR processor for a particular time segment. A forward section 1210 includes at least a portion of a forward computational sequence, sometimes referred to as forward propagation or forward pass. A backward section 1211 includes at least a portion of a backward computational sequence, sometimes referred to as back propagation.

Forward propagation sequentially calculates and stores intermediate variables within the computational graph defined by the neural network. It proceeds from the input to the output layer. Backpropagation sequentially calculates and stores the gradients of intermediate variables and parameters within the neural network in the reversed order. These gradients are used to update the parameters of the ML model to reduce the error in the model. When training deep learning models, forward propagation and back propagation are interdependent.

A Rectified Linear Unit (ReLU) is an example of an activation function used in machine learning models. The forward section 1210 shows a portion of the computational graph. The output of the Rectified Linear Unit 1250 is an output 1260 of the forward section 1260. Intermediate results are the outputs of sections that are used as an input to another section. These intermediate results are typically saved to DRAM by one section and loaded from DRAM by another section.

A checkpoint is a section output of a forward (FWD) computation that is a section input to a backward (BWD) computation. Checkpoints from FWD computations often consume large amounts of memory bandwidth. Bandwidth usage can be reduced to the extent section boundaries are selected so that section checkpoints may be naturally combined with section intermediate results.

Output 1265 is a section intermediate result but also a checkpoint in that it is an output of the forward section 1210 that is input into the backward section 1211.

Further or Additional Considerations

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR processor; or (iv) a combination of aforementioned items.

What is claimed is:

1. A computer-implemented method of transforming a high-level program into configuration data executable by a coarse-grained reconfigurable (CGR) processor including one or more arrays of CGR units, comprising:

sectioning a dataflow graph of the high-level program into a plurality of sections to be mapped to the one or more arrays of CGR units of the CGR processor;

extracting performance information for each of the plurality of sections;

assigning a section of the plurality of sections that includes at least two computations dependent on a first data element to one or more CGR units of the CGR processor, wherein the first data element is loaded from a memory;

scheduling an additional load of the first data element from the memory based at least in part on the performance information for the section indicating available memory bandwidth for the section;

eliminating from the section, a buffer between a load of the first data element from the memory and one of the two computations dependent on the first data element;

generating the configuration data for the CGR processor including placed positions, data routing, and communication channels, wherein the configuration data, when loaded onto an instance of the one or more arrays of CGR units of the CGR processor, causes the one or more arrays of CGR units to implement at least the section of the dataflow graph; and storing the configuration data in a non-transitory computer-readable storage medium.

2. The computer-implemented method of claim 1, wherein the sectioning prefers section boundaries that combine section intermediate results with checkpoints.

3. The computer-implemented method of claim 1, further comprising:

inserting a re-computation of a second data element based at least in part on the performance information for a second section of the plurality of sections indicating inadequate memory resources for at least the second section of the plurality of sections.

4. A non-transitory computer-readable storage medium storing computer program instructions, wherein the computer program instructions, when executed on a processor, implement a method comprising:

sectioning a dataflow graph of a high-level program into a plurality of sections, the high-level program to be transformed into configuration data executable by a coarse-grained reconfigurable (CGR) processor including one or more arrays of CGR units, wherein the plurality of sections are to be mapped to the one or more arrays of CGR units of the CGR processor;

extracting performance information for each of the plurality of sections;

assigning a section of the plurality of sections that includes at least two computations dependent on a first data element to one or more CGR units of the CGR processor, wherein the first data element is loaded from a memory;

scheduling an additional load of the first data element to from the memory based at least in part on the performance information for the section indicating available memory bandwidth for that section;

eliminating, from the section, a buffer between a load of the first data element from the memory and one of the two computations dependent on the first data element; and generating the configuration data for the CGR processor including placed positions, data routing, and communication channels, wherein the configuration data, when loaded onto an instance of the one or more arrays of CGR units of the CGR processor, causes the one or more arrays of CGR units to implement at least the section of the dataflow graph.

5. The non-transitory computer-readable storage medium of claim 4, wherein the sectioning prefers section boundaries that combine section intermediate results with checkpoints.

6. The non-transitory computer-readable storage medium of claim 4, the method further comprising:

inserting a re-computation of a second data element based at least in part on the performance information for a second section of the plurality of sections indicating inadequate memory resources for at least the second section of the plurality of sections.

7. A system including one or more processors coupled to a memory, the memory loaded with computer program instructions, wherein the computer program instructions, when executed on the one or more processors, implement actions comprising:

sectioning a dataflow graph of a high-level program into a plurality of sections, the high-level program to be transformed into configuration data executable by a coarse-grained reconfigurable (CGR) processor including one or more arrays of CGR units, wherein the plurality of sections are to be mapped to the one or more arrays of CGR units of the CGR processor, extracting performance information for each of the plurality of sections;

assigning a section of the plurality of sections that includes at least two computations dependent on a first data element to one or more CGR units of the CGR processor, wherein the first data element is loaded from a memory;

scheduling an additional load of the first data element from the memory based at least in part on the performance information for the section indicating available memory bandwidth for that section;

eliminating, from the section, a buffer between a load of the first data element from the memory and one of the two computations dependent on the first data element; and generating the configuration data for the CGR processor including placed positions, data routing and communication channels, wherein the configuration data, when loaded onto an instance of the one or more arrays of CGR units of the CGR processor, causes the one or more arrays of CGR units to implement the at least section of the dataflow graph.

8. The computer-implemented method of claim 7, wherein the sectioning prefers section boundaries that combine section intermediate results with checkpoints.

9. The computer-implemented method of claim 7, further comprising:

inserting a re-computation of a second data element based at least in part on the performance information for a second section of the plurality of sections indicating inadequate memory resources for at least the second section of the plurality of sections.

\* \* \* \* \*